Aug. 4, 1925.

P. W. SPRECHER 1,548,491

ELECTRIC FIXTURE HANGER

Filed Sept. 25, 1924

Witness:
R. E. Weber

Inventor:
Peter W. Sprecher
By
Attorneys

Patented Aug. 4, 1925.

1,548,491

UNITED STATES PATENT OFFICE.

PETER W. SPRECHER, OF MILWAUKEE, WISCONSIN.

ELECTRIC-FIXTURE HANGER.

Application filed September 25, 1924. Serial No. 739,774.

*To all whom it may concern:*

Be it known that I, PETER W. SPRECHER, a citizen of the United States, and resident of Milwaukee, in the county of Milwaukee and State of Wisconsin, have invented certain new and useful Improvements in Electric-Fixture Hangers; and I do hereby declare that the following is a full, clear, and exact description thereof.

My invention relates to electric fixture hangers of the type which are adapted to be secured to the ceiling or side wall of a room to support an electric fixture therefrom.

The general object of the invention is to simplify and otherwise improve the construction of such a device whereby it may be manufactured at minimum expense and easily installed.

A more specific object of the invention is to provide a canopy and means for supporting the same of improved construction, whereby the suspension link is attached directly to the canopy, the latter being supported by a screw passing centrally through the bottom thereof and the wires passing out through openings at opposite sides of the screw.

In general this invention is an improvement over that disclosed in my prior Patent No. 1,505,108 for electric fixture hangers issued August 19, 1924, and further objects of this invention are to provide means for supporting a canopy with its ends spaced a predetermined distance in an invariable manner from the hickey or support so as to prevent variation of this length due to inaccuracy or difficulty in manufacture, so that the ceiling will not be cut or marred by having the edges of the canopy pressed therein when the suspending member is adjusted.

Figure 1:
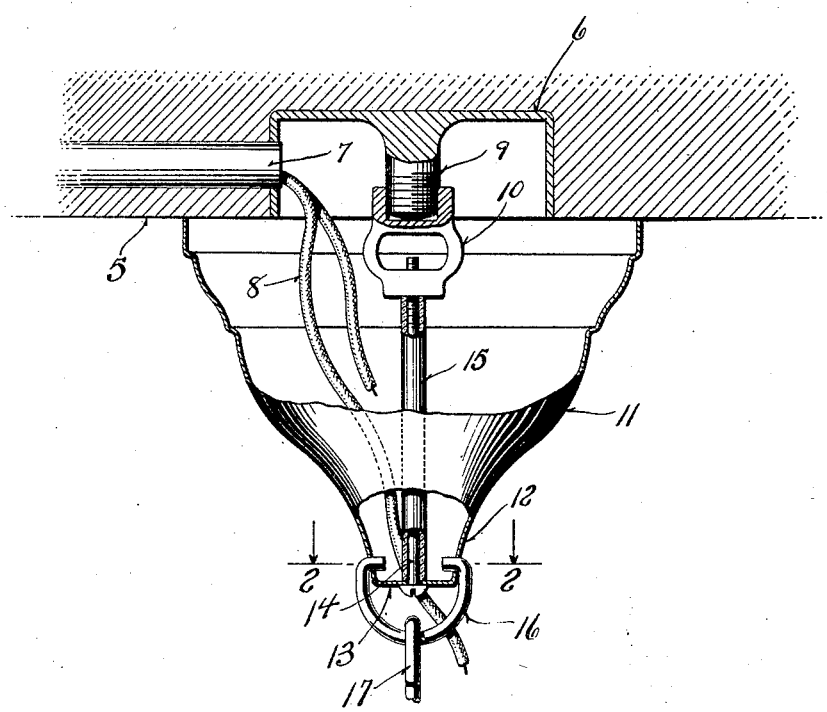
Figure 2:
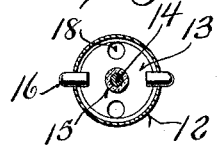

In describing my invention, reference will be had to the accompanying drawings, in which Figure 1 represents a vertical sectional view through an outlet box with my invention attached thereto, and Figure 2 is a sectional plan view taken on the line 2—2 of Figure 1.

Referring in detail to the drawing, the numeral 5 indicates the ceiling or wall of a room, in which is secured an outlet box 6, connected with which is a conduit 7, through which the wires 8 are introduced. A supporting stud 9 is secured centrally to the outlet box and a suitable insulating joint or hickey 10 is attached thereto. A canopy 11 is secured so as to enclose the outlet box. This canopy is preferably made from one piece of sheet metal pressed into the shape illustrated with an elongated lower portion 12 which terminates in a flat plate-like end portion 13. A screw 14 of suitable length is passed centrally through the end 13 and threaded into the hickey 10. This screw is surrounded by a spacing sleeve 15 preferably of insulating material which spaces the end 13 from the hickey and supports the same against the pressure of the head of the screw 14.

Thus it will be seen that a strong and durable support is formed for the suspension ring 16, which supports a chain pendant 17 or other form of electric light fixture. The end portion 13 of the canopy is also provided with a suitable number of openings 18 at each side of the screw head, through which the wires may pass to the light.

It is to be noted particularly that due to the single piece construction of the sleeve 15 that it is impossible to inaccurately space the plate 13 at the end of the canopy from the hickey or support.

It has been found, that in the structure disclosed in the prior patent issued to me and noted above, that considerable difficulty is experienced in properly fitting the spacing sleeve and the lower block in such patent and consequently due to slight inaccuracies in the making of these two members, the canopy has frequently been forced into the ceiling when the suspending screw was tightened, thus causing chipping and cutting of the ceiling. However, by providing a single sleeve of one-piece construction as in the present case, this difficulty is wholly overcome and the large chance of error in the manufacture of the spacing sleeve is avoided, so that a very accurate spacing of the canopy from the suspension member is at all times assured.

While I have shown and described specifically one structure by means of which the invention may be embodied, it will be understood that minor modifications may be made in the structure thereof, without departing from the spirit of the invention, as defined in the appended claim.

I claim:

The combination of a canopy formed of a single piece of metal and having a truncated conical shape with its larger end open and its smaller end closed by an integral transverse plate-like end, said plate-like end having a central aperture and a pair of diametrically located apertures, a supporting member, an elongated headed screw passing through said central aperture and screwed into said supporting member with the head of the screw on the outer side of said plate-like end and spaced from said pair of apertures, a one-piece spacing sleeve positioned between said plate-like end, and said support, said canopy having a pair of diametrically located apertures through its sides adjacent its closed end, and located in a plane at right angles to the plane including said first mentioned apertures, said side apertures forming bearings, a U-shaped suspension ring having inturned ends fitting within such bearing apertures, and conductors extending directly through such end through said first recited pair of apertures.

In testimony that I claim the foregoing I have hereunto set my hand at Milwaukee, in the county of Milwaukee and State of Wisconsin.

PETER W. SPRECHER.